United States Patent [19]

Cocks

[11] Patent Number: 4,593,360

[45] Date of Patent: Jun. 3, 1986

[54] FLUID SPRAY CONTROL SYSTEM

[76] Inventor: Eric H. Cocks, 4100 Galt Ocean Dr., Fort Lauderdale, Fla. 33308

[21] Appl. No.: 562,081

[22] Filed: Dec. 16, 1983

[51] Int. Cl.⁴ .......................... G06F 15/46; B05B 5/02

[52] U.S. Cl. .................................... 364/468; 118/696; 239/69; 239/416; 364/510

[58] Field of Search ............... 364/468, 469, 478, 479, 364/509, 510; 239/290, 61, 62, 69, 70, 71, 186, 300, 301, 306, 307, 416; 118/696–698, 704, 324; 901/43

[56] References Cited

U.S. PATENT DOCUMENTS

| | | | |
|---|---|---|---|
| 2,088,542 | 7/1937 | Westin | 239/290 X |
| 2,733,099 | 1/1956 | Schlumberger | 239/290 X |
| 2,867,476 | 1/1959 | Siefen | 239/290 |
| 2,895,686 | 7/1959 | Peeps | 239/290 X |
| 3,296,015 | 1/1967 | Juvinall et al. | 239/290 X |
| 3,301,488 | 1/1967 | Norris | 239/290 X |
| 3,348,774 | 10/1967 | Wiggins | 239/70 |
| 3,477,870 | 11/1969 | Boretti et al. | 118/302 X |
| 3,939,855 | 2/1976 | Wiggins | 239/70 X |
| 4,357,900 | 11/1982 | Buschor | 118/324 X |
| 4,448,821 | 5/1984 | Buschor | 118/697 X |

*Primary Examiner*—Joseph Ruggiero
*Attorney, Agent, or Firm*—Richard M. Saccocio

[57] ABSTRACT

A computer controlled fluid spray control system for spraying a plurality of different fluids is disclosed. The control system provides for the individual setting, sensing, adjustment and control of spray fluid pressure, atomizing air pressure, fan control air pressure and traversing speed of the spray gun which sprays the fluid to be applied to workpieces arranged on a moving conveyor line. Plant ambient conditions are monitored to allow and effectuate spray control setting adjustments. The preselected spray control settings may be temporarily or permanently changed as required.

5 Claims, 1 Drawing Figure

FLUID SPRAY CONTROL SYSTEM

CROSS REFERENCES TO RELATED APPLICATIONS

This application is related to the U.S. patent application filed on Oct. 3, 1983, Ser. No. 538,660, entitled "Improved Spray Apparatus" by Eric H. Cocks, now abandoned.

BACKGROUND OF THE INVENTION

1. Field of the Invention

This invention relates in general to the field of fluid spray systems and in particular a control system for atomized air spray apparatus used in conjunction with automatic fluid spraying operations such as spray painting motor vehicles in motor vehicle manufacturing plants.

2. Description of the Prior Art

Control apparatus used for spraying fluids are utilized in many industries and for spraying or applying sundry fluids, each particular use having its own set of specialized requirements. In virtually all of these uses, however, the fluid to be sprayed is first pressurized then atomized or dispersed and then the spray pattern is shaped while being applied. Thus, a control system is required in all applications so that the correct fluid flow and the various operating pressures are achieved.

Industrial paint spraying apparatus used in motor vehicle assembly manufacturing plants is perhaps the most sophisticated of the various types of fluid spray apparatus and control systems in use today. Yet, even such sophisticated equipment and systems are not without need for improvement.

Typically, a prime painted motor vehicle body is carried on a conveyor chain or belt moving at a preselected constant rate of speed past a robotic paint spraying station. There are preset spaces between such motor vehicle bodies so as to result in a preselected length of time between the motor vehicle bodies, depending, of course, upon the rate of speed of the conveyor belt. For automobile bodies, the painting operation lasts approximately 45 seconds with 15 second intervals between the vehicle bodies. The 15 second interval is used to solvent wash the internals of the paint spraying equipment and the lines connected thereto so that another color of paint may then be used to spray paint the next vehicle body approaching the painting station. In this manner, provided the color programming is properly set, motor vehicle bodies may be painted any of the number of colors being used for the particular year and in any sequence.

Typical equipment used for motor vehicle body spray painting includes automatic paint spray guns mounted on mechanical reciprocating apparatus to traverse the spray guns at right angles to the movement of the conveyor. Usually, one such reciprocating mechanism is placed on each side of the motor vehicle body to spray paint the sides thereof and one reciprocating mechanism is placed overhead to spray paint the top of the body. In the prior art, the reciprocating mechanism includes a constant speed motor which drives an endless chain to which the spray gun is attached. A second degree of motion is obtained by another mechanism which allows the spray gun to move perpendicular to the direction of motion of the endless chain, or toward and away from the vehicle body, so as to maintain a relatively constant distance of the spray gun from the particular area being sprayed. The two degrees of motion of the spray apparatus in combination with the speed of the conveyor belt thus allows for spray painting of the contoured body of the motor vehicle. In order to obtain a uniform coating of the paint, it is necessary that the speed of the movement of the conveyor, the speed of the traverse and right angle motion of the spray gun and the spray makeup and pattern produced by the spray gun to be synchronized in a manner such that the uniform coating results. Such operations, in the prior art are accomplished automatically with various types of control mechanism and to activate and deactivate the spray guns.

The spray guns used with the prior art mechanism invariably utilize shop or plant air, suitably pressurized, to control the rate of flow of the paint, the degree of atomization of the paint and the size and shape of the fan, which factors also contribute to a uniform covering. Too little atomizing air causes inadequate atomization which in turn causes drops of paint to be applied to the surface being painted. Too much atomizing air will result in excessive atomization of the paint which will cause it to be deposited in a dry or dusty condition and will cause considerable turbulence blowing much of the paint around the area to be painted. Too little and too much atomizing air, therefore, produces unsatisfactory results. Fan control air, likewise, is an important consideration. For example, if all other conditions remain constant and correct painting was being obtained by using an 8-inch effective fan, and if for any reason the fan diminished to a 6-inch effective size, then instead of a uniform and full application of paint, a "V" striped type of pattern would be applied. Of course, this would be unsatisfactory and require later touchup corrections by manual means. Fluid pressure is an important consideration in that it controls the amount of volume of paint dispensed by the spray apparatus and which is applied to the workpiece. A correct and constant preselected volume of paint dispensed by the spray apparatus is essential to the quality of the end product. Too much paint may run or "curtain"; while, too little paint will result in inadequate coverage. Also, variations in fluid pressure affect the ability of the preset atomizing and fan air pressures to produce the desired effect.

Unfortunately, it is very difficult to independently adjust and control the above parameters with the prior art spray systems due in part to the prior art spray guns, the design of which includes a manual control for adjusting the fan pattern as an integral part of the spray gun, and the manually adjustable control system. For example, assuming that there are 15 different colors being used in a production year, each paint color has its own particular characteristics which require different settings. White paint has much less hiding characteristics than black paint; therefore, more white paint must be applied to adequately conceal the prime painted body than if black paint were being applied. Also, the equipment must be set to deliver the correct amount of paint at a certain width pattern at the correct distance from the workpiece and apply this at a certain gun traverse speed. If the spray equipment is set to apply white paint, the same settings would apply too much black paint which is not only costly but may produce an unsatisfactory result. Although, as stated, the prior art equipment allows for manual adjustment, to a degree, of the paint pressure, fan size, atomizing air flow, etc., the adjustments are difficult, time consuming, not precise nor are they capable of being repeated, and require prepainting tests to assure that the proper settings are achieved. Usually, the integral spray gun adjustments are, therefore, set at a compromise position and the air pressure and flow controls of the control system are set in one position and not thereafter adjusted. The resulting effect is highly undesirable. Too much or not enough paint is applied. The coating is not uniform and there are unpainted areas requiring manual paint spraying corrections. The overall effect is not satisfactory.

Even further, in typical manufacturing plants where shop air is used with the present day spray guns and control systems, the variations in ambient conditions can also affect the ability of motor vehicle manufacturers to produce a consistent high quality painted finish. Temperature and humidity changes within the plant may require more or less paint of a given color, different settings to the atomizing air and different settings to the fan size to optimize the resulting finish. At present, due again to the difficulty of adjusting the spray equipment, such variations are generally ignored.

The inventive spray apparatus disclosed in the above-referenced related patent application overcomes the prior art problems associated with the prior art spray guns. The use of such inventive spray apparatus does not, however, completely solve all the problems of the prior art. Unless properly controlled, even the most advanced spray apparatus cannot in and of itself consistently accomplish optimal results. And, as previously stated, the control systems of the prior art are generally inadequate in achieving optimal results under the numerous and diverse operating conditions and the various variables inherent in the fluid to be sprayed.

With the strong competition from abroad and the high quality of the finish and the paint applied to the imported products, the inadequacies of the present-day spray control systems can no longer be tolerated.

Accordingly, the objects of the present invention include but are not limited to providing a control system for spraying fluids onto a workpiece which control system may be used in different industries for different applications and which permits the attainment of preselected optimal spray parameters to achieve a consistent high quality finish regardless of factory ambient conditions, spray fluid characteristics, and other spraying variables. And, to provide a spray control system which permits simple and effective changes to the system to adjust for any change or deviation from the optimal finish as actually applied regardless of the reason therefor.

SUMMARY OF THE INVENTION

The present invention overcomes the problems of the prior art and achieves the above-stated objectives in addition to others not specifically mentioned by providing a fluid spray control system which functions in conjunction with an automatic fluid spray gun or apparatus.

A fluid spray gun is attached to a traversing mechanism which is provided with a variable speed electric motor. The spray gun is supplied with separate sources of pressurized atomizing gas, pressurized fan control gas, gas pressurized spray fluid and spray gun activating gas. Each source of pressurized gas is regulated by a gas pilot operated regulating valve which in turn are each controlled by a computer controlled pneumatic transducer. The traversing mechanism is likewise computer controlled. Ambient conditions within the spray booth and within the plant may be input to the computer for purposes of effectuating any spray operation changes which may be required. Consoles within the spray booth and at a main control station will allow for programming, programming changes and program override as the need arises. The inventive control system will, therefore, provide for exact, preselected spray operation settings consistent with any color or type of fluid being sprayed and will allow for any required temporary changes to the settings and will allow exact reestablishment of the previously set settings for precise, consistent control of the spraying operations.

Various other objects, advantages and features of the invention will become apparent to those skilled in the art from the following discussion taken in conjunction with the following drawings, in which:

DESCRIPTION OF THE PREFERRED EMBODIMENTS

Figure 1:
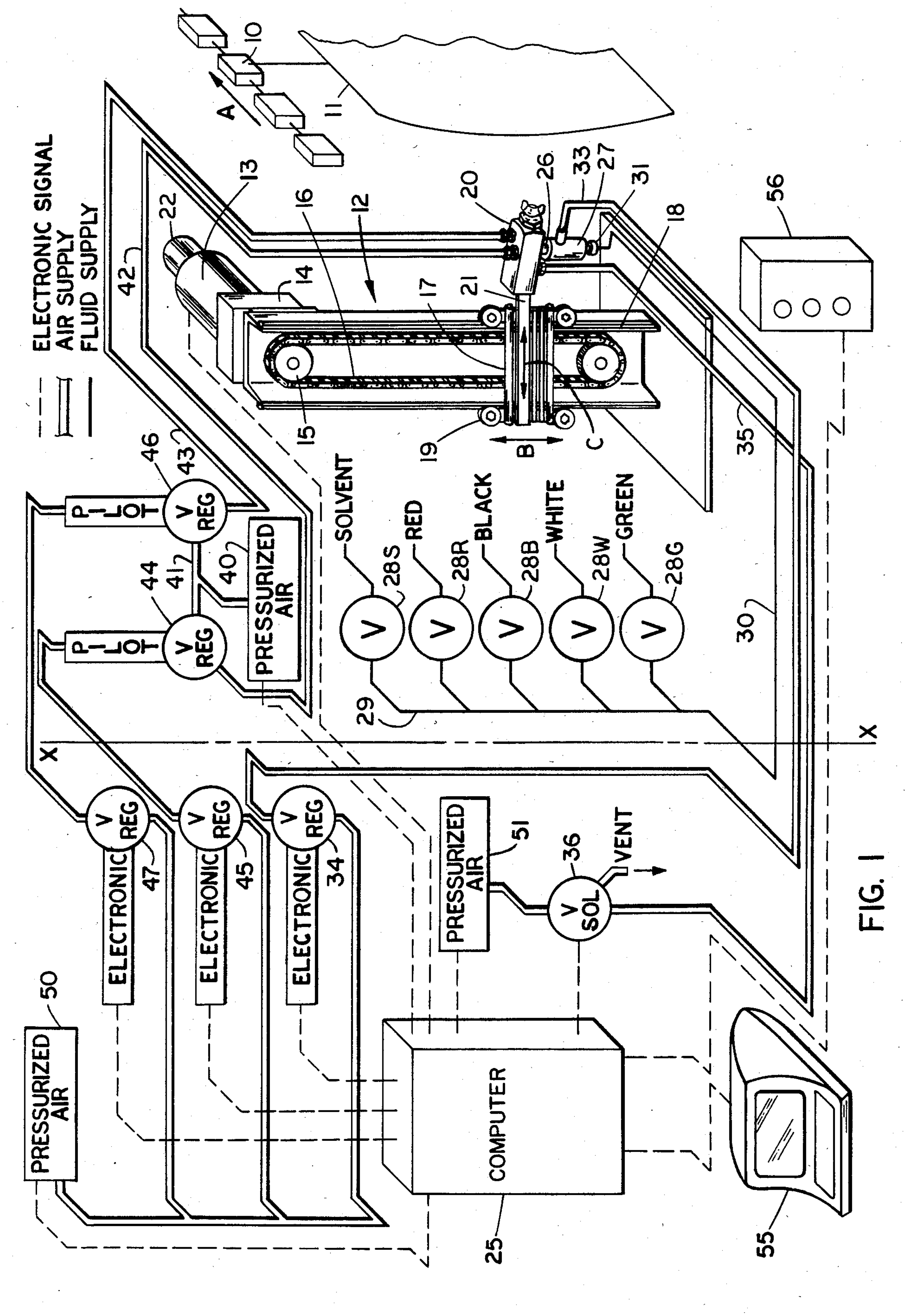
FIG. 1 is a combination flow diagram and apparatus cabinet drawing of the inventive control system as applied to one type of spray apparatus.

Referring now to the drawing, there is depicted therein a typical general arrangement of a spray system incorporating one embodiment of the inventive control system.

A conveyor belt 10 has attached thereto a contoured workpiece 11 which is to be sprayed with a fluid such as paint. Conveyor belt 10 may be traveling at a constant rate of speed in the direction of the arrow A past a robotic work station which may comprise a paint spraying booth the inside of which is schematically denoted by line X—X in the drawing. Line X—X may, in fact, be a wall or other structure separating the hazardous spraying area from the remainder of the plant or building for reasons of personnel and equipment safety. A reciprocating or traversing mechanism 12 comprising a motor 13 connected to a speed reduction unit 14 is connected to sprocket 15 which drives an endless chain 16. A carriage 17 is attached to chain 16 and is mounted upon tracks 18 by wheels 19. A fluid spray gun 20 is mounted to carriage 17 by bar 21. Carriage 17 moves in the direction of arrows B; while, bar 21 moves in the direction of arrow C. Hence, spray gun 20 moves at right angles to the direction of motion of workpiece 11 and perpendicular to the direction of motion of workpiece 11. Both degrees of motion of spray gun 20 are necessary to properly position spray gun 20 relative to the contoured shape of workpiece 11 so that the fluid, such as paint, being sprayed may be properly applied to workpiece 11, assuming, of course, that all other parameters are proper and correct.

Motor 13 is a variable speed direct current motor which allows for the selection of a predetermined optimal speed of the spray gun 20 in the B directions. The C direction of travel of spray gun 20 may be cam coupled to the travel in the B direction; hence, the C direction of travel will be consistent with the contoured shape of workpiece 11 regardless of the speed in the B direction. The C direction movement can alternatively, be suitably controlled by a mechanical drive such as a motor, worm screw, cylinder, etc., to give a variety of motions which are not necessarily coupled to the B degree of motion. This separate C degree of motion may be predetermined and controlled by computer 25. Also, similar mechanisms may be used to swivel or tilt gun 20; this additional degree of motion may again be controlled by computer 25. Motor 13 is electronically connected to the later described computer apparatus 25 which is programmed to vary the speed of motor 13 in accordance with preselected parameters which, based on the fluid being sprayed and the size of the fan of the spray, results in gun 20 applying the correct amount of fluid which, in the example used, is paint. In addition to the computer controlled variable speed, a shaft speed indicator 22 is connected to motor 13 for purposes of comparing the actual speed of motor 13 with the input speed signal from computer 25. The signal from the shaft speed indicator is backfed into the computer 25 which determines the variation, if any, between the actual speed and the preselected speed, and makes the necessary adjustments to bring the actual motor speed to the desired preselected speed. The computer controlled speed input signal to motor 13 also includes the parameters comprising the difference in loading of the traversing carriage 17 due to its weight on an up stroke as compared to a down stroke, and correcting for the difference to maintain a uniform spray gun speed in the B directions.

Spray gun 20, which may be of a type disclosed in my co-pending application filed Oct. 3, 1983, Ser. No. 538,660, includes a fluid connection 26 for supplying pressurized fluid to the spray nozzle within spray gun 20. A pilot operated fluid regulating valve 27 is connected to fluid connector 26. A plurality of paints of various colors are connected by valve 28 to a manifold 29 which is connected to the regulating valve 27 of spray gun 20. Valves 28 may be solenoid operated and are each electronically connected to computer 25. In this manner, the particular color to be next applied to each workpiece 11 sequentially brought into the spray booth by conveyor 10 is applied in accordance with the program input to computer 25. A suitable solvent is also connected by valve 28 to manifold 29. The solvent may be used to flush and clean the fluid flow line 30 to pilot valve 27, pilot valve 27, and spray gun 20 in between applying one of the various colors of paints to a workpiece 11. Alternatively, connection 31, which comprises the fluid connection to pilot valve 27, may be quick disconnect fit connection, and each of the colors to be sprayed may be individually and manually connected to pilot valve 27 prior to spray painting that particular color. In either alternative, the fluid to be sprayed is pressurized to a level in line 30 above the fluid pressure within gun 20, which fluid pressure may be different for each color of paint. The change from the line pressure to the preselected optimal fluid pressure is accomplished by pilot valve 27 in accordance with the pneumatic control signal input to pilot valve 27 through line 33. The pneumatic control signal in line 33 is supplied by a pneumatic transducer 34 which may be a regulating valve which is controlled by an electrical signal output from computer 25. The electrical signal from computer 25, which establishes the pneumatic control signal output from transducer 34, is programmed in accordance with previously established optimal fluid pressures for each different color of paint being sprayed. In the example used, when transducer 34 receives an electrical signal from computer 25, it produces and provides a pneumatic signal to the air pilot operated regulating valve 27, which causes valve 27 to operate and pass the particular color of paint which is to be applied and which is available at the upstream connection 31, through the valve 27 at the preselected pressure to the spray gun 20. The supply source of each paint as well as manifold 29 and all paint supply lines such as line 30 to spray gun 20 may be contained within the hazard area or spray booth for reasons of safety.

It is to be noted that air pilot operating valve 27 delivers the particular fluid to be applied to gun 20 at a preselected pressure. It does not cause spray gun 20 to commence spraying. The pneumatic signal delivered through line 35 causes the commencement of the spraying operations. The pneumatic operating signal to gun 20 is controlled by solenoid valve 36 which causes the pneumatic operating signal, which may comprise pressurized air, to be delivered to an air cylinder (not shown) within gun 20 causing the opening of a needle valve (not shown) allowing the pressurized fluid to be dispensed from gun 20. Venting of the pneumatic operating signal from gun 20 through valve 36 closes the needle valve and stops further dispensing of the pressurized fluid. Valve 36 is controlled by and electronically connected to computer 25. In this manner, the commencement of spraying operations may be preprogrammed for automatic and precise operation in conjunction with the particular color of paint to be sprayed and in conjunction with the particular optimal fluid pressure of the paint to be sprayed. Furthermore, such preprogrammed spraying may be further combined with the travel speed of gun 20 as controlled by the traversing mechanism which is also computer 25 controlled. In the event that the spray gun 20 may use a solenoid coil (not shown) to open and close a needle valve within gun 20 to commence and stop spraying operations, the electrical signal input to the solenoid coil may be directly supplied by computer 25 to effectuate the above-described automatic operation of spray gun 20.

As previously mentioned, the control of atomizing air is yet another important parameter necessary to achieve a high quality finish on workpiece 11. The atomizing air exits from gun 20 through an orifice, surrounds the stream of pressurized fluid ejected from gun 20 and mixes with the fluid causing it to become atomized, spread out and formed into the shape of a diverging cone. Too much or too little atomizing air will cause a poor quality finish. For each fluid or color of paint prepared by a particular manufacturer, there exists an optimal amount and pressure of atomizing air to be used. For a given type and size of atomizing air orifice in gun 20 there exists an optimum pressure for the various fluids being sprayed. The optimal pressures can be determined by suitable testing in advance of the spraying operations. The predetermined pressures may then be programmed into computer 25 and controlled by computer as follows. The pressurized plant inlet air 40 is connected to air pilot operated regulating valve 44 by manifold 41. A pneumatic signal is applied to the diaphragm of valve 44 as directed by regulating valve 45 which is electronically coupled to computer 25. The spray pressures preprogrammed in computer 25 then cause the optimal predetermined spray pressure to be delivered by valve 44 through line 42 to spray gun 20 and then be discharged therefrom.

Fan control air is still another factor in achieving a quality finish on workpiece 11. Fan control air flattens or adjusts the size of the spray to assure proper overlapping of the spray being applied consistent with the speeds of traversing mechanism 12 and conveyor line 10. Like the atomizing air, the optimal pressure of the fan control air can be predetermined for particular fluids and the size of the orifices in gun 20. These predetermined pressures may also be programmed into computer 25 and controlled thereby. The pressurized plant inlet air 40 is connected to air pilot operated regulating valve 46 by manifold 41. A pneumatic signal is applied to the diaphragm of valve 46 as directed by regulating valve 47 which is electronically connected to computer 25. The fan control air pressures programmed in computer 25 then causes the optimal predetermined fan control air pressure to be delivered by valve 46 through line 43 to gun 20 and then be discharged therefrom. Lines 32, 33, 35, 42 and 43 to gun 20 may be flexible to allow movement of gun 20 by traversing mechanism 12.

For precise maintenance and delivery of the fluid pressure, atomizing air pressure and fan control pressure, pressure transducers (not shown) may be included in lines 30 and 33, 42, and 43 and electronically connected to computer 25. In this manner, readings of the actual pressures may be made and compared to the predetermined optimal pressures and thereby effectuate any necessary changes. It is preferable that the transducers are located as close as possible to gun 20 to eliminate variations due to line pressure drops.

The temperature and humidity of the pressurized plant air are further parameters which can affect the paint spray and hence the quality of the finish applied to workpiece 11. The ambient conditions of the plant air and the pressurizing filtering, cooling and dehumidifying of the pressurized plant air are variable and may be sensed and/or controlled by computer 25 as shown in the figure to assure the delivery of consistent quality pressurized plant air. Pressurized plant air 40, 50 and 51 are respectively delivered to manifold 41, solenoid valve 36, and manifold 52, the latter being used for the pneumatic control signals supplied by valves 34, 45 and 47. In this manner, computer 25 may control substantially all the spraying variables and parameters which need to be controlled to obtain consistent high quality results on workpiece 11.

Computer 25 may comprise a miniaturized microprocessor, suitably housed, and as is well known in the art. A typical keyboard and CRT readout screen 55 may be coupled to computer 25 to allow changes or additions to the program used with the spray control system to be input when deemed necessary and/or allow override of the computer program to temporarily change any predetermined system variable or parameter in the event a temporary spraying adjustment is required for any reason. An operator's console 56 may also be electronically connected to computer 25 and located within the paint spray booth to allow the operation to signal the computer 25 to start operations, cease operations, flush the system, change the color to be sprayed, etc.

The following is a typical simplified explanation of the operation of the inventive control system. For purposes of this explanation, it is assumed that the system is in operation with plant air being available, paint being available and all fluid and electrical connections are made and that all predetermined variables, parameters and conditions have been preprogrammed into computer 25. For example, red paint requires 20 psi fluid pressure, 60 psi atomizing pressure and 50 psi fan control pressure, while white paint requires 30 psi fluid pressure, 75 psi atomizing pressure and 60 psi fan control pressure. The speed of traversing mechanism for red paint should be 3 feet per second and for white paint should be 2 feet per second. It is to be noted, that the stated numbers are purely arbitrary and selected only for purposes of this description.

As the workpiece 11 arrives at a point immediately prior to painting, it is to be assumed that the computer 25 has established and set all the parameters to spray red paint and positioned gun 20 by the traversing mechanism 12 to its start position. The position of workpiece 11 coupled to computer 25 or the operator using console 56 activates motor 13. Sensor 22, through computer 25, adjusts the electrical power to maintain the proper preselected speed of motor 25. When the signal to commence spraying is given either manually or by computer 25, gun 20 is activated by solenoid valve 36 and red paint at 20 psi is available at valve 27. As spraying starts, any pressure drop in the 20 psi fluid pressure is sensed and corrected for by regulating valve 34 through computer 25. The atomizing air pressure and the fan control pressure are turned on through operation of regulating valves 44 and 46 and any pressure drop is sensed and corrected for by valves 45 and 47 through computer 25. Simultaneously, traversing mechanism 12 is activated and red paint is sprayed onto workpiece 11. When the workpiece 11 is completely sprayed, the spray gun 20 is shut off and traversing mechanism 12 comes to rest with gun 20 relocated to its original start position.

After the red painted workpiece 11 has left the spray booth, the gun 20 is flushed with solvent prior to the next workpiece arriving.

Since the next workpiece 11 is to be painted white, this color is either manually set or set by computer 25. In either case, the computer resets the fluid pressure to 30 psi, the atomizing air pressure to 75 psi, the fan control pressure to 60 psi and the traversing mechanism 12 speed to 2 feet per second. Then spraying of the white paint would commence, continue, and stop as described above for the red paint. The gun 20 would be solvent cleaned and the next workpiece would be sprayed with its preselected color.

In the event the operator detects a defect in the spraying operation of a particular color of paint, he would advise the supervisor who would determine the change necessary to correct the defect and enter the change into the computer 25 via keyboard 55. The original setting may be retained in the event the defect is temporary; or, the original setting may be changed in the event a permanent change is required.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

I claim:

1. A control system for spraying a fluid onto a workpiece comprising:

fluid spray apparatus;

computer controlled means for supplying to said fluid spray apparatus, at a predetermined pressure, the fluid to be sprayed by said fluid spray apparatus;

computer controlled means for supplying to said fluid spray apparatus, a first gas at a predetermined pressure for atomizing the fluid to be sprayed;

computer controlled means for supplying to said fluid spray apparatus, a second gas at a predetermined pressure for adjusting the size of the fan of the spray from the spary apparatus; and, said computer controlled fluid spray supply means comprising a pilot operated regulating valve located substantially adjacent to said fluid spray apparatus, having a fluid inlet port, a fluid outlet port and a pilot port, said fluid to be sprayed being flow connected to said fluid inlet port and said fluid outlet port being flow connected to said spray apparatus, an electronic regulating valve flow connected to a pressurized gas at its inlet and flow connected to said pilot valve at its pilot port, and a computer, said computer being electronically connected to said electronic regulating valve.

2. The control system of claim 1, further comprising computer controlled means for activating and deactivating the spray apparatus to commence and cease spraying, respectively.

3. The control system of claim 1, wherein said computer controlled means for atomizing the fluid to be sprayed comprises a pilot operated regulating valve having a gas inlet port, a gas outlet port and a pilot port, said gas inlet port being flow connected to a pressurized source of said first gas, said gas outlet port being flow connected to said spray apparatus, an electronic regulating valve flow connected at its inlet port to a third source of pressurized gas and flow connected at its outlet port to said pilot port, and a computer, said computer being electronically connected to said electronic regulating valve.

4. The control system of claim 1, wherein said computer controlled means for adjusting the size of the fan comprises a pilot operated regulating valve having a gas inlet port, a gas outlet port and a pilot port, said gas inlet port being flow connected to a pressurized source of said second gas, said gas outlet port being flow connected to said spray apparatus, an electronic regulating valve flow connected at its inlet port to a third source of pressurized gas and flow connected at its outlet port to said pilot port, and a computer, said computer being electronically connected to said electronic regulating valve.

5. The control system of claim 1, further comprising a motor operated traversing mechanism with said spray apparatus being mounted thereon, said motor comprising a variable speed motor, and a computer electronically connected to said motor.

* * * * *